United States Patent
Kensy et al.

(10) Patent No.: US 10,421,071 B2
(45) Date of Patent: Sep. 24, 2019

(54) MICROREACTOR SYSTEM (71) Applicant: m2p-labs GmbH, Baesweiler (DE)

(72) Inventors: Frank Kensy, Cologne (DE); Niklas Frische, Geilenkirchen (DE); Carsten Mueller, Herzogenrath (DE)

(73) Assignee: m2p-labs GmbH, Baesweiler (DE)

( * ) Notice: Subject to any disclaimer, the term of this patent is extended or adjusted under 35 U.S.C. 154(b) by 298 days.

(21) Appl. No.: 15/027,782

(22) PCT Filed: Oct. 7, 2014

(86) PCT No.: PCT/DE2014/000487
§ 371 (c)(1),
(2) Date: Apr. 7, 2016

(87) PCT Pub. No.: WO2015/051776
PCT Pub. Date: Apr. 16, 2015

(65) Prior Publication Data
US 2016/0250636 A1 Sep. 1, 2016

(30) Foreign Application Priority Data
Oct. 7, 2013 (DE) .......................... 10 2013 016 521

(51) Int. Cl.
*B01L 3/00* (2006.01)
*F16K 99/00* (2006.01)

(52) U.S. Cl.
CPC ..... *B01L 3/502715* (2013.01); *B01L 3/50273* (2013.01); *B01L 3/502738* (2013.01); *F16K 99/0015* (2013.01); *F16K 99/0059* (2013.01); *B01L 2200/0605* (2013.01); *B01L 2300/041* (2013.01); *B01L 2300/044* (2013.01); *B01L 2300/06* (2013.01); *B01L 2300/0627* (2013.01); *B01L 2300/0654* (2013.01); *B01L 2300/0816* (2013.01); *B01L 2300/0829* (2013.01); *B01L 2300/12* (2013.01); *B01L 2300/123* (2013.01); *B01L 2400/0487* (2013.01); *B01L 2400/06* (2013.01); *B01L 2400/0638* (2013.01); *F16K 2099/0084* (2013.01)

(58) Field of Classification Search
CPC .................... B01L 2400/0638; B01L 3/50273
USPC .................................................. 422/505, 503
See application file for complete search history.

(56) References Cited

U.S. PATENT DOCUMENTS 4,858,883 A * 8/1989 Webster .................... F16K 7/17
251/61.1
7,217,395 B2 5/2007 Sander
(Continued)

FOREIGN PATENT DOCUMENTS

EP 1 331 538 A1 7/2003
WO 2004/034028 A2 4/2004

OTHER PUBLICATIONS

International Search Report of PCT/DE2014/000487, dated Mar. 18, 2015.

*Primary Examiner* — Natalia Levkovich
(74) *Attorney, Agent, or Firm* — Collard & Roe, P.C.

(57) ABSTRACT

A device and method for the individual dosing or drainage of small quantities of liquids or gases in microreactors and microreactor arrays, having a membrane and an outlet to a reaction chamber or a reactor arranged therebelow, which is surrounded by an area which forms a fluid line with the membrane, wherein the area or the membrane has an annular elevation which can be arranged around the outlet.

36 Claims, 7 Drawing Sheets

(56) References Cited

U.S. PATENT DOCUMENTS

2003/0136178 A1\* 7/2003 Cabuz .................. F04B 43/043
73/31.02
2003/0234376 A1 12/2003 Cabuz et al.

\* cited by examiner

MICROREACTOR SYSTEM

CROSS REFERENCE TO RELATED APPLICATIONS

This application is the National Stage of PCT/DE2014/000487 filed on Oct. 7, 2014, which claims priority under 35 U.S.C. § 119 of German Application No. 10 2013 016 521.0 filed on Oct. 7, 2013, the disclosure of which is incorporated by reference. The international application under PCT article 21(2) was not published in English.

The invention relates to a microreactor system having a membrane and an outlet to a reaction chamber or a reactor arranged therebelow, which is surrounded by an area which forms a fluid line with the membrane, and a use of a microreactor system of this type.

In particular, the invention relates to a device for individual dosing or drainage of small quantities of liquids or gases in microreactors and microreactor arrays, such as e.g. microtitre plates. Furthermore, the invention describes an overall system for simple realisation of liquid or gas transport within a microreactor array.

An array according to the invention of this type can consist of an actuator-like connection strip, the microreactor array with integrated microfluidic chip, a cover of the array and a tensioning device. In this case, the system should be very simple to handle and there should not be any complex hose connections to be connected manually. The microreactor array with integrated microfluidic chip is simply inserted, tensioned and then operated directly. The actuator system can be implemented in a self-adjusting manner and then does not require any manual interventions. The microfluidic chip consists of valves, which are realised from a ball segment with a concentric linear seal and a flexible membrane. Microchannels open into the centre of the valve and onto the circumference of the ball segment. The flexible membrane car be moved by means of an actuator system and can be closed and opened so that liquid or gas transport can be controlled at least between two channels.

Microtitre plates for carrying out tests are very common in biotechnology. Microreactor arrays of up to 6, 24, 48, 96, 384 or even 1536 microreactors can be realised by means of conventional titre plates. Just as the number of microreactors can vary strongly, the volume of the individual reactors can also be different. Although one already talks of microreactors at dimensions below 10 ml, a further reduction of the volume to below 1 ml, below 500 µl, below 100 µl or even below 10 µl may entail advantages. The surface-volume ratio increased by the volume reduction becomes greater and therefore oxygen entry into the reaction solution due to simple diffusion becomes easier. The microreactor arrays can be shaken continuously until the end of the reaction. Individual dosing allows different experiments to be carried out in each individual reactor. The invention is suited in particular to the automation of screening experiments in a fed-batch operating method, a continuous operating method and/or with pH regulation. It relates in particular to microbial, cell-culture, biochemical, enzymatic and chemical reactions. The invention allows sterile, aseptic or monoseptic operation.

Process parameters, such as e.g. pH value, dissolved-oxygen, dissolved-carbon-dioxide, biomass, educt and product concentrations or temperature can be used as control variables for regulating the dosing. A non-invasive detection of process parameters by means of optical or electrical measurement methods through the base, which is permeable to electromagnetic radiation, is particularly suitable in connection with the invention.

In the case of biocatalytic systems in particular, the demand for many parallel experiments at the micro-liter scale is particularly high, because such processes generally progress relatively slowly and are more expensive than comparable chemical processes especially in the development phase. Therefore, there is a requirement to develop microbioreactors which deliver a suitable environment for biological cultivation and biocatalytic reactors in the smallest space. Two criteria are to be highlighted here as important prerequisites for suitable operating conditions: the possibility to carry out corresponding experiments, under sterile or monoseptic conditions and the guarantee of a suitable and satisfactory matter transfer (liquid-liquid, liquid-gas, solid-liquid, solid-gas) for the biological culture or biocatalytic reaction system.

To screen biological systems, the individual reaction chambers are filled, inoculated and incubated on a rotary shaker. The entry of oxygen into the reaction liquids is improved by means of the shaking movement and thorough mixing of the reaction liquids is achieved. To keep the system sterile, the microtitre plates are covered by an air-permeable membrane (pore size<0.2 µm) or airtight film or a lid construction, or cultivated openly in a sterile environment.

To carry out the different biocatalytic reactions, it is necessary multiple times during the ongoing experiment to add various fluids (incl. gases) to the ongoing reaction. The supply of pH adjusting, agents (alkalis and acids) for pH titration of the ongoing reaction and the addition of substrates are to be highlighted in particular in this regard. Only the supply of substrates during the process allows the carrying our of regulated batch, fed-batch and continuous processes. These operating modes are particularly important for a flexible and successful biological screening and further method development.

The introduction of sensors for monitoring the cultivation parameters in this case constitutes less of a problem than liquid transport to the individual cultivation wells.

In the fed-batch application of microfluidics, the emphasis is on controlled, sterile liquid transport, which is in the one- to two-digit nanoliter range. Many types of micro-valves were used hitherto in order to achieve this, of which pneumatic membrane valves are the most promising due to their rapid response time and high pressure loading. These can be integrated directly in the chip and therefore sterilised in a single manufacturing step. A further possibility is the use of piezoelectric actuators, which are only used in a few complex fluid channels due to their size-dependent force and adjustment paths, however.

The existing microfluidic approaches for the transport and for the control of the smallest quantities of liquid in microreactors principally have the defect that they do not allow a sterile closure of the microreactor array by a membrane or a lid and do not allow dosing or drainage of liquids during the continuous shaking of the microreactor array for thorough mixing of the reaction liquids and for setting satisfactory matter transfer rates.

Starting from this prior art, the invention is based on the object of developing a microreactor system for the conduction of liquids and gases.

This object is achieved using a microreactor system with the features of Patent Claim 1.

Advantageous developments are the subject of the subclaims. Microreactor systems of this type can achieve the following objects in different embodiments: Supply and drainage of liquids or gases in fluid quantities in the nano- or pico-liter range, controlled liquid or gas transport through connected membrane valves, "plug and play" connection of the microfluidic reactors to the actuator system, online measurement of process parameters, regulation of the process parameters in the microreactors by means of liquid or gas transport into and out of the microreactors (within a control loop), sterile or monoseptic operation of the microreactors, realisation of comparable method operating conditions (kLa value, OTR, εmax, etc.) to in the laboratory and production scale, manufacturability and use as disposable items, quantification of the dosed volumes.

A combination of microreactor arrays with corresponding in- and outflows of different fluid channels, what is known as a fluid system, is advantageous for this. The fluid system can consist of a microstructured plate which uses membrane valves with linear seals for controlling the liquid and gas flows. The membrane valves can in this case have the shape of a concave ball segment with a concentrically arranged linear seal (cutaway torus, polygon, or web of any desired shape) and have a membrane, which can be actuated in order to switch the valve (open and close the connection between two channels). The microfluidic plate can construct the base of a microreactor array or a microtitre plate and be connected to the same. The membrane valves can be arranged in such a manner that they in each case lie at the edge of the plate and expose the central region of the base for measurements in the microreactors (free access to the microreactors). The microreactor array is preferably closed at the top with a gas-permeable membrane or cover. Furthermore, the microfluidic plate can simply be placed with the microreactor array on a tray with integrated actuator system without individual actuator units having to be connected. The microreactor array can be realised in a self-adjusting manner and centre-itself by means of the installed actuator system (e.g. by means of locking pins). The system can be connected to the actuator system in a positive fitting manner (pneumatically sealed or mechanically without slippage) by means of simple force application from above onto the microreactor array. Furthermore, the microreactor array can be installed on a shaker and/or enclosed by an incubation chamber. Sensor signals (pH, $pO_2$, $pCO_2$, biomass, fluorescence, glucose, vitality and further process variables) from the microreactors can be detected from the base of the microreactor array. The sensor signals can then be processed by a computer or microprocessor in a control loop and, depending on the controller setting, volumes for dosing to the microreactors can be calculated. These volumes are then conveyed through the described fluid system to the individual microreactors of the array. A specific reservoir, from which the volume is conveyed, can be assigned to each sensor measured value. In this case, acids and/or bases can be provided in the reservoirs for pH regulation and substrates such as glucose or glycerine can be provided in the reservoirs for biomass growth and product production.

The microreactor array can furthermore be designed in such a manner that the cover of the reactors is to be opened in an individually reversible manner and one gains access to the individual microreactors either manually or using a pipetting robot. This can be realised by means of a septum, or by means of a closure (such as e.g. a plug). As a result, one can drain volumes from the microreactors by means of a pipette (e.g. for taking a sample) and vice versa can also dose volumes. It may be necessary that gases also have to be dosed from above into the microreactors, e.g. in order to regulate the gas concentration in the head space of the reaction chambers. In this case, it is provided to apply a further cover onto the microreactor array, which contains a gas supply system. The gas supply system conveys defined gases to the individual reaction chambers. The dosing and connection of the gases via the gas supply system takes place by means of external valves. The gas supply system can be constructed like the system for introducing liquids. In this case, a gas supply system can be arranged on the upper side of the microreactor system and a liquid, supply and drainage system can be supplied on the underside.

The control of the individual membrane valves can be realised by means of different methods. What is meant here, inter alia, are different pneumatic control channels, but optically, thermally, hydraulically, electromechanically or magnetically actuated switches can also be used for fluid channel control. In order to minimise a diffusion of the reaction media within the reactor back into the fluid channels, simple passive valves (e.g. lymph valves or venous valves) can also be realised at the outlet of a channel into the reaction chamber.

The microreactor system can be used to dose at least two different nutrient solutions into each microreactor of an array with a minimum flow of a few nl (1-1000 nl) and thus to allow a controlled liquid or gas supply into a microreactor. This is facilitated by the use of an elastic membrane (PE, PU, PTFE), which has been joined to a microfluidic chip (PS, PG, PP, PET, PMMA, PL, PEEK, PTFE). The membrane is gas-impermeable to a great extent and additionally highly flexible, so that the valves of the microfluidic chip are sealed in a leak-free manner. This benefits from the design, presented here, of the membrane valve as a concave ball segment with concentric line layout and at least two channel access points. The switching sequence of the valves can be configured such that one constant volume, which is not medium dependent, is always conveyed. In addition to the functionality, the advantages of this material combination lie in the possibility of a cost-effective series production.

Furthermore, the process parameters in the microreactors can be monitored continuously by a sensor system. The sensor signals can be used for a controlled or regulated supply of liquids or gases to the microreactors via the fluid system. The use of a cover on the microreactors makes it possible to operate sterile or monoseptic processes. To this end, all materials used are sterilised in advance thermally or by means of radiation. The entire microreactor array with the microreactor microfluidic chip (base) is designed as a disposable item and can be used directly without a great deal of preparation and disposed of afterwards.

One particular embodiment provides the simple clamping of the microreactor array in a device by means of force action from above. As a result, the microreactor array is pushed onto the actuator system, which preferably aligns itself and is held in position on the shaking tray. The microreactor array can be placed in the clamping integrated on the shaking tray and is automatically aligned there by means of locking holes of the microfluidic chip and the locking pins on the shaking tray, which fit the same. As a result, all valves of the microfluidic chip are preferably automatically positioned above the associated actuator system. The chip and the tray are separated from one another by means of an elastic seal (e.g. PDMS). The airtight clamping takes place automatically by means of a pneumatic device. After the installation of the microreactor array, the array can directly be used as a microreactor system with individual process parameter regulation (e.g. pH value) and with individual continuous supply and drainage of reaction partners (e.g. substrates in fermentation).

An overall system was designed, which has the following properties: Microreactor array of 2-2000 microreactors, microfluidic system with membrane valves, online measurement of process parameters, individual pH regulation, individual dosing of reaction partners, individual regulation of the gas concentrations in the reaction chambers by gas supply by means of a gas supply system from above, sterile or monoseptic reaction control, "plug and play" installation and use, regulated reaction control in an incubator with temperature, moisture $O_2$, $N_2$, $CO_2$ regulation, simple scalability by compliance with method characteristic variables (e.g. kLa value), by using a shaker, disposable item and quantification of the dosed volumes.

The components to be used according to the invention, which are previously mentioned as well as claimed and described in the exemplary embodiments are not subject to any specific exceptions in terms of their size, shape, design, material selection and technical concepts, so that the selection criteria known in the area of application can be applied without exception.

Further details, features and advantages of the subject of the invention result from the subclaims, as well as from the following description of the associated drawings, in which—by way of example—an exemplary embodiment of the invention is illustrated. In the figures FIG. 13 shows a plan view onto a gas supply cover, FIG. 14 schematically shows a pump sequence with an outlet valve using the example of pH regulation, and FIG. 15 schematically shows a pump sequence with a plurality of valves.

Figure 1:
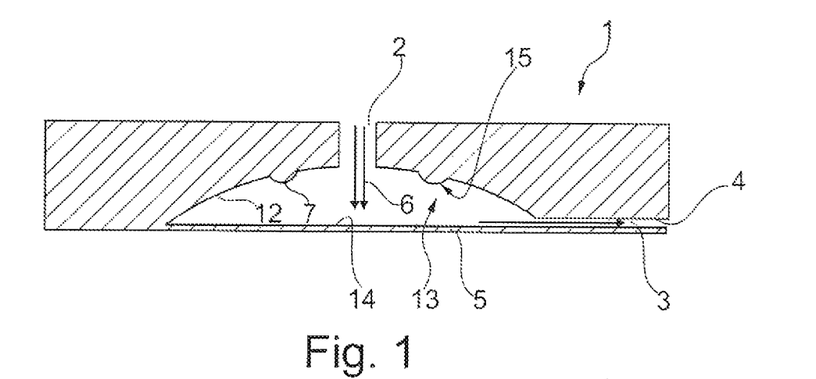
FIG. 1 shows a section through the valve of the microreactor system with open outlet.
Figure 2:
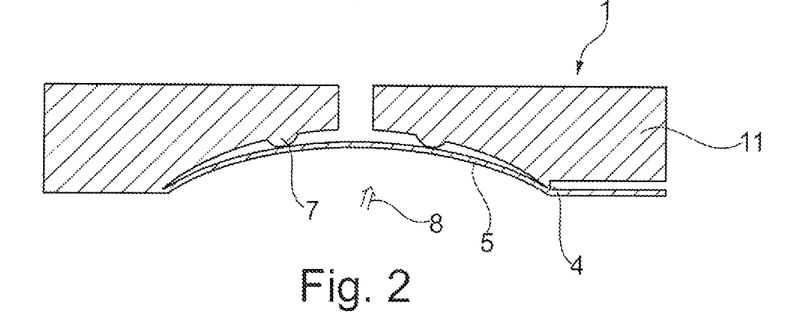
FIG. 2 shows a further section through the microreactor system shown in FIG. 1 with closed outlet.
Figure 3:
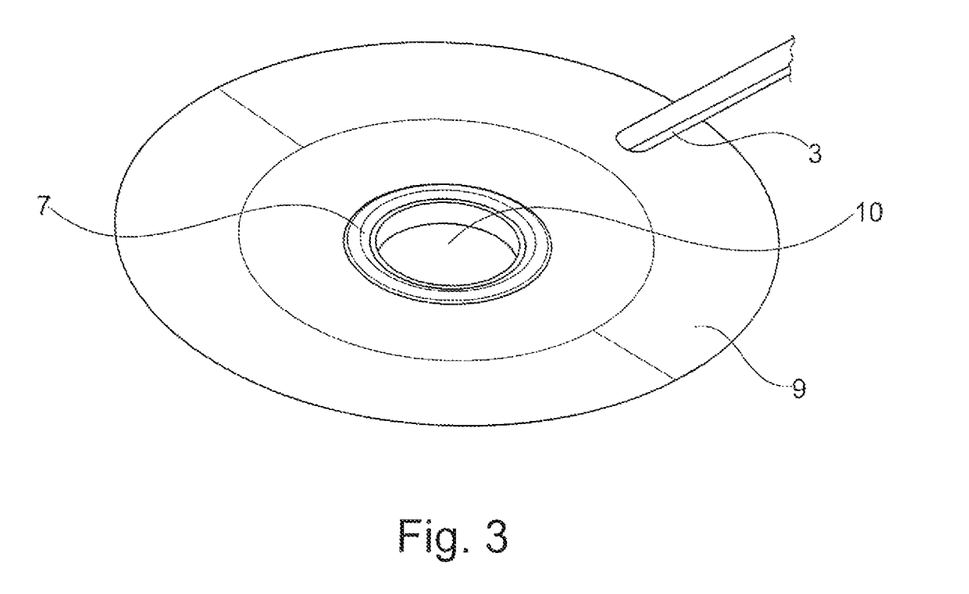
FIG. 3 shows a view of the valve from below without a membrane, FIG. 4 schematically shows the change in planes within a microreactor array, FIG. 5 schematically shows the arrangement of the valves as a multiplexer, FIG. 6 schematically shows a pump.

The valve 1 of a microreactor system shown in FIGS. 1 to 3 has a liquid inlet located at the top, which is used as an outlet 2, and orthogonally thereto has an outlet channel 3 on the underside 4, which is covered with a thin membrane 5. For a better seal, an annular elevation 7 is attached as a linear seal concentrically around the outlet 2 for a liquid 6. In the case of a loading of the membrane 5 with pneumatic or mechanical pressure 8 shown in FIG. 2, the membrane 5 bears against the linear seal and thus seals the valve 1.

The FIG. 3 shows that the valve 1 has a round diameter and is configured, as a concave ball segment 9 with a maximum depth in the centre 10. The outlet 2, which is used as a liquid inlet and conveys the liquid 6 from above into the valve 1, is located centrally. A protruding structure is located around the outlet 2, which—as an annular elevation 7—functions as a linear seal for example. The membrane 5 can bear in a leak-free manner here and thus seal the valve 1. The valve outlet 3 is located at the edge of the valve 1 and leads directly into a microfluidic channel 10. The membrane bears against the underside 4 of the base body 11 of the valve 1 laterally next to the outlet 3. Thus, the outlet is surrounded by an area 12, which forms a fluid line 13 with the membrane 5, and has an annular elevation 7 for supporting the sealing.

In the exemplary embodiment, the membrane has a planar side 14 facing the base body 11 and an annular elevation 7, which is arcuate in section, is constructed opposite this side, in order to offer a satisfactory bearing surface with the arcuate surface 15 on the one hand and a satisfactory contact pressure on the other hand.

Figure 4:
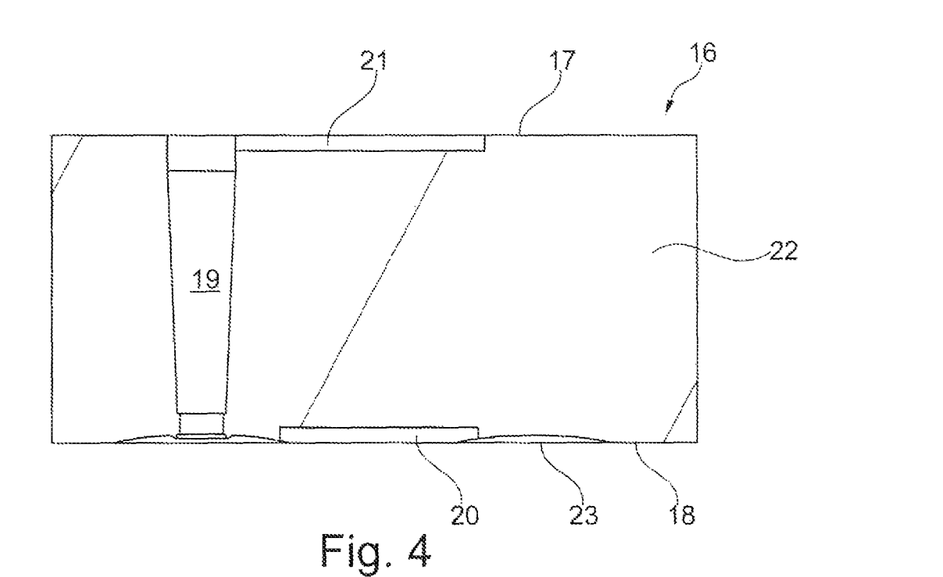

The particular functionality of the valves 1 is particularly important in the case of a change in planes of the liquid from the upper to the underside of a microreactor array 16 constructed as a microfluidic chip. This means that, when using the described valves 1, networks of microchannels are present on both sides 17, 18 of the chip and so conduct the fluids from reservoirs via the valves into reaction chambers. In FIG. 4, the microfluidically structured plate 22 of the microreactor array 16 is constructed with an outlet 19, which leads from a lower channel 20 to an upper channels 21, and which is covered with the membrane 23.

Figure 5:
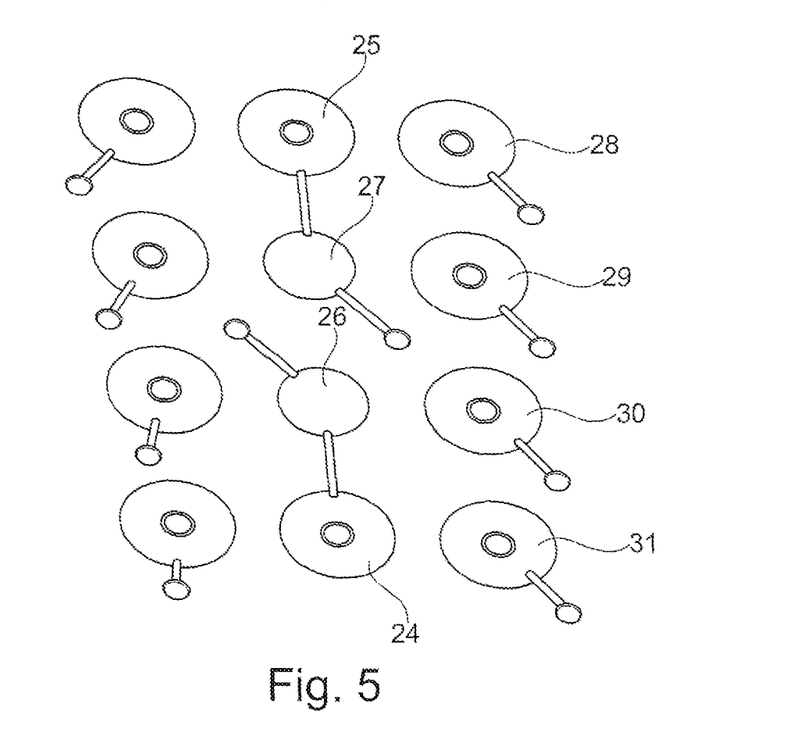

The arrangement of the valves shown in FIG. 5 is designed such that there is always an inlet valve (24, 25), a pump valve (26, 27) and four outlet valves (28, 29, 30, 31) connected one behind the other. A multiplexer is created as a result, so that as here, e.g. up to four reaction chambers (wells) can be supplied by one reservoir.

Figure 6:
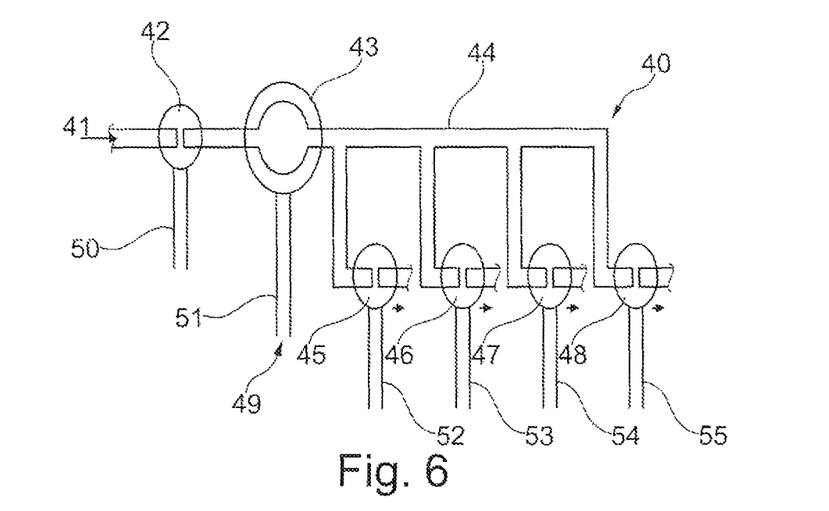

FIG. 6 shows a pump 40, using which e.g. a liquid 41 coming from a reservoir makes it through an inlet valve 42 into a pump chamber 43. Thus, then the inlet valve 42 is closed, the liquid is under pressure, in order to be conveyed via a fluid system 44 depending on the requirement, by opening one of the valves 45 to 48, into a well (not shown). For that, the valves are operated by means of an actuator system or actuator-like connection strip 49 made up of tappets or pneumatic lines 50 to 55.

Figure 7:
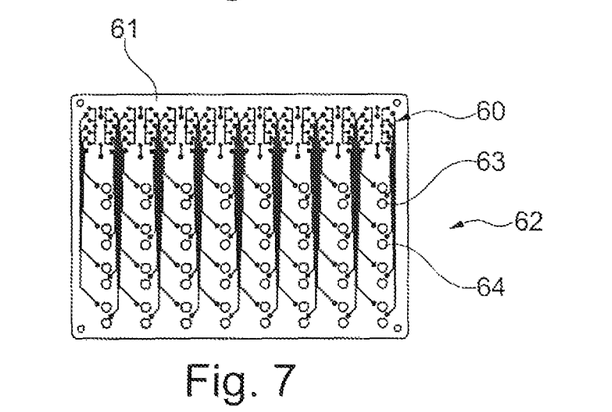
FIG. 7 shows the placement of the valves.
Figure 8:
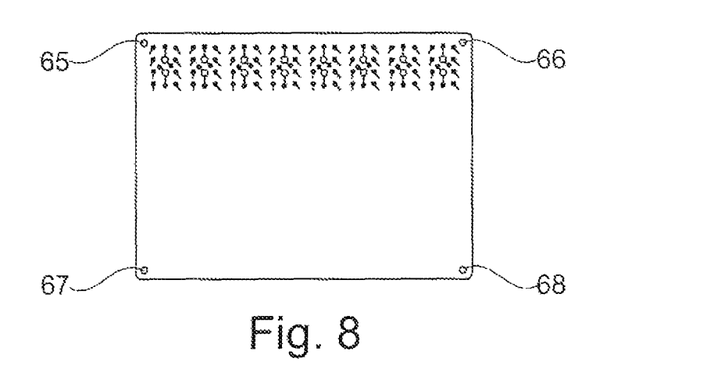
FIG. 8 shows the centring of the valves.

FIGS. 7 and 8 show an advantageous placement of the valves 60 on the top edge 61 of the microfluidic chip 62, directly below the reservoir (not shown). This ensures a free optical area below the reaction chambers for the optical reading of the signals, for example using optodes 63 and 64. The precise centring of the valves 60 takes place via locking holes 65 to 68, into which the pins 95, which are provided on a distributor strip 90, are plugged. This guarantees a pinpoint alignment of the valves.

Figure 9:
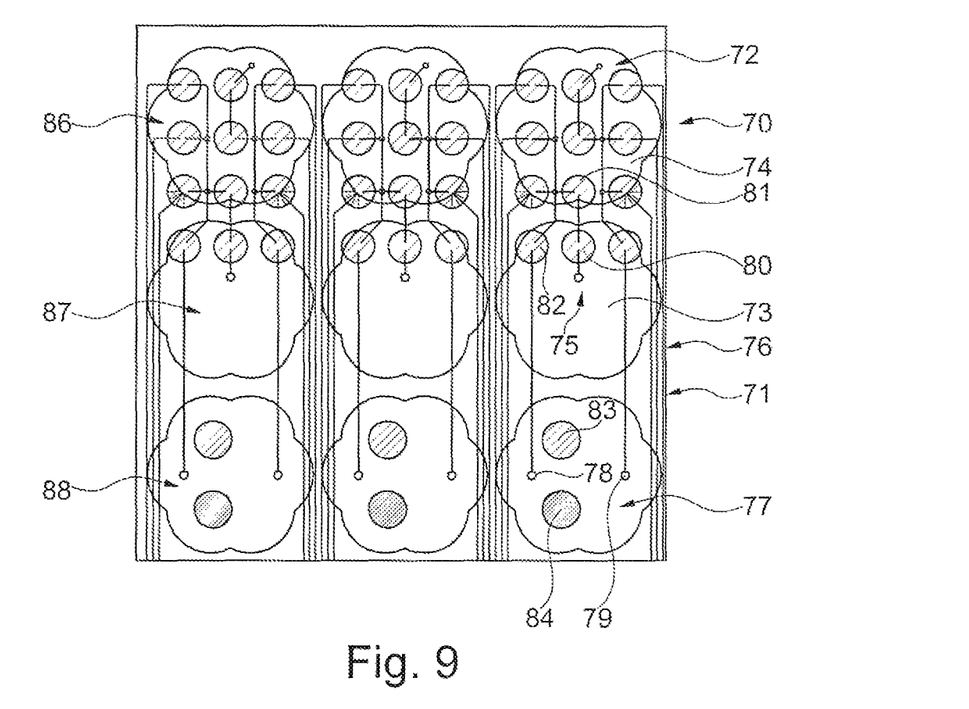
FIG. 9 shows a chip on a microtitre plate.

FIG. 9 shows how a chip 70 can be integrated in such a manner onto a microtitre plate 71, that the valves 72 are located below the reservoirs 73. Here, the valves 72 cover two reservoirs 73, 74 in each case. In each reservoir, there is at least one inlet 75, which is connected to fluid channels 76 and a network of valves 72. Each reaction chamber 77 has at least one outlet 78, 79, so that at least one fluid can be dosed. The fluid transport takes place starting from the reservoir 73, 74 via the inlet 75 into the inlet valve 80, the pump chamber 81, the outlet valve 82, via the outlet 78, in order to then open in the reaction chamber 77. Optodes 83, 84 in the reaction chambers 77 measure the process parameters in the reaction chambers 77 as sensors and can be read via the base 85 of the microtitre plate 71. FIG. 9 shows a section with two reservoir rows 86, 87 and a reaction chamber row 88, which is also termed the well row. The process parameters in the reaction chambers can then be regulated by supplying fluids in a closed control loop.

Figure 10:
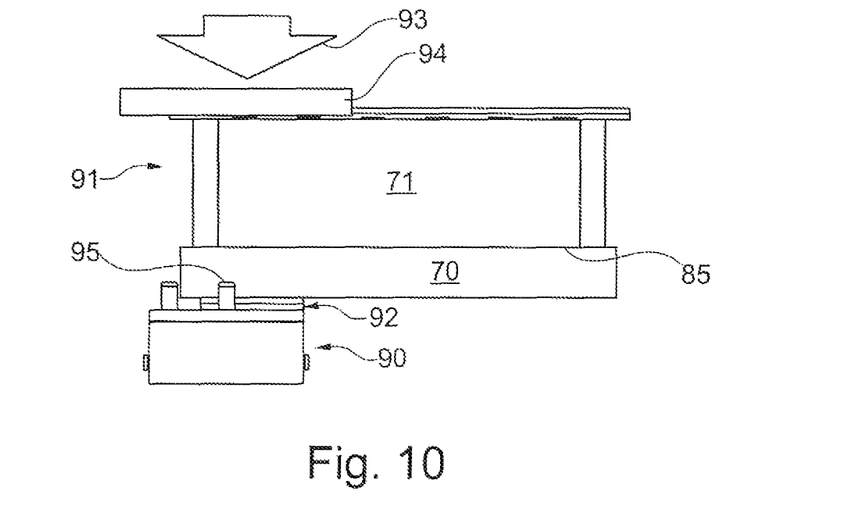
FIG. 10 shows the clamping of a microtitre plate.

The microtitre plate 71 must be connected to a pneumatic control 90 in an airtight manner. To this end, the base 85 of the microtitre plate 71, which is formed by the microfluidic chip 70, is placed on a seal 92 on the valve side 91. By means of permanent force action 93 on the clamping lid 94 fixed on the microtitre plate 71, the microtitre plate 71 and the microfluidic chip 70 are connected to the pneumatic control 90. The clamping lid 94 has a pneumatic initial pressure outlet and a seal.

Figure 11:
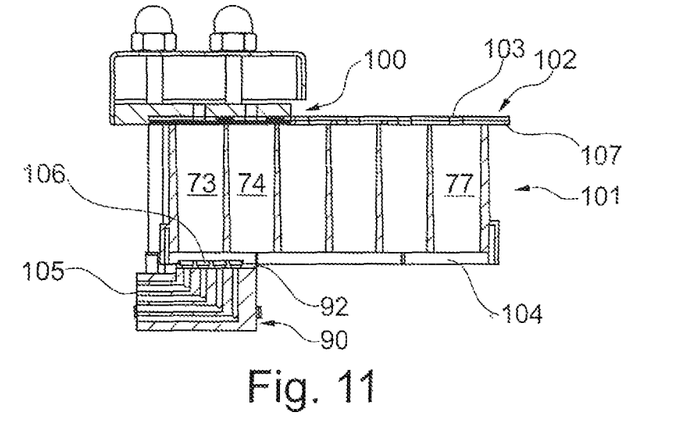
FIG. 11 shows a section through a clamped microtitre plate, FIG. 12 the view from below of a gas supply cover.

The overall system for the function of the microfluidic microtitre plate is shown in FIG. 11 and consists of the airtight clamping 100 of the microtitre plate 101, which is connected via a seal 92 to the distributor strip 90. Retraction springs (not shown) make sure that when relaxed, the lid 102 is lifted. The lid 102 has at least two air inlets 103, which supply the microtitre plate 101 with overpressure if required, in order to press liquid into the microfluidic chip 104. The distributor strip 90 has a hose connection 105 for each valve, through which pneumatic pressure is conveyed to the microvalves 106, which regulate the flow. A gas supply device 107 is located above the microtitre plate. Channels 108 are incorporated into this device, which convey gases to the reaction chambers 77 and additionally have ventilation in order to ensure optimum gas exchange of the reaction chambers 77.

Figure 12:
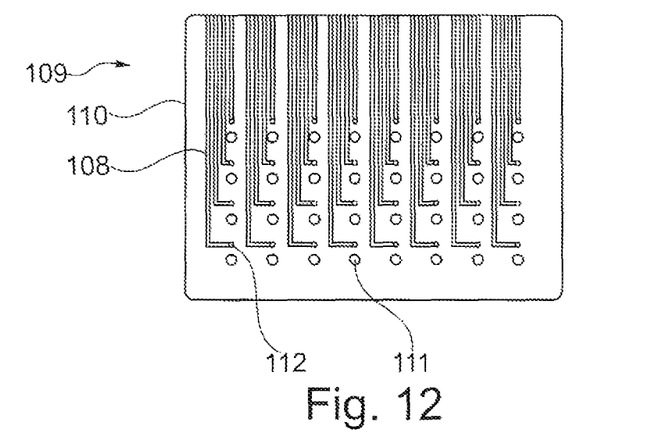
Figure 13:
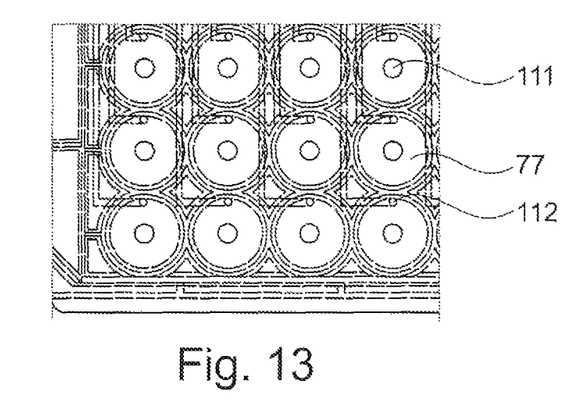

The gas supply system 109 with the gas supply cover 110 is located above the reaction chambers 77. The system is configured such that at least one gas supply channel 108 leads by way of an outlet hole 112 for the gas supply into each reaction chamber 77 and thus an individual gas transfer to each required reaction chamber 77 is possible. Thus, gas concentrations can be regulated inside the reaction chambers 77. The gas supply system 109 additionally has ventilation holes 111 for the gas exchange between the reaction chambers 77 and the environment.

When using the device 120, the active valves 121 are driven by externally connected compressed air 122. The valves 121 consist of a base layer 123 with embedded fluid channels 124. At the valve seat, the fluid channels are interrupted by a step 125. At the top, the channels 124 are terminated by an elastically deformable membrane 126, which is joined onto the base layer 123 of the microfluid chip 127. At the valve seat 128, the membrane 126 is not joined to the base layer 123, it can be lifted from the valve seat 128 and enable a fluid flow if the pneumatic pressure over the membrane 126 is sufficiently small compared to the pressure in the fluid line of the fluid channels 124. An increased external pneumatic pressure closes the valve 121. AS a result, a fluid channel 124 can be opened and closed between a reservoir 129, which is under pressure, and a well 130 in a microtitre plate 131. pH and DOT optodes are located in the well 130 and a silicone seal 132 is located below the membrane for sealing the compressed air 122.

All described microfluid chips and microtitre plates can be arranged on a shaking tray 133 particularly easily if pneumatic connections are provided in the tray 133 of a shaker (not shown).

This design described on the basis of the valve can have art annular elevation, like the previously described apparatuses, for increasing the contact pressure, which elevation is not arranged around an outlet on a valve of this type, but rather is on the valve seat and preferably concentric to the valve seat, as shown in FIGS. 1 to 3.

Figure 14:
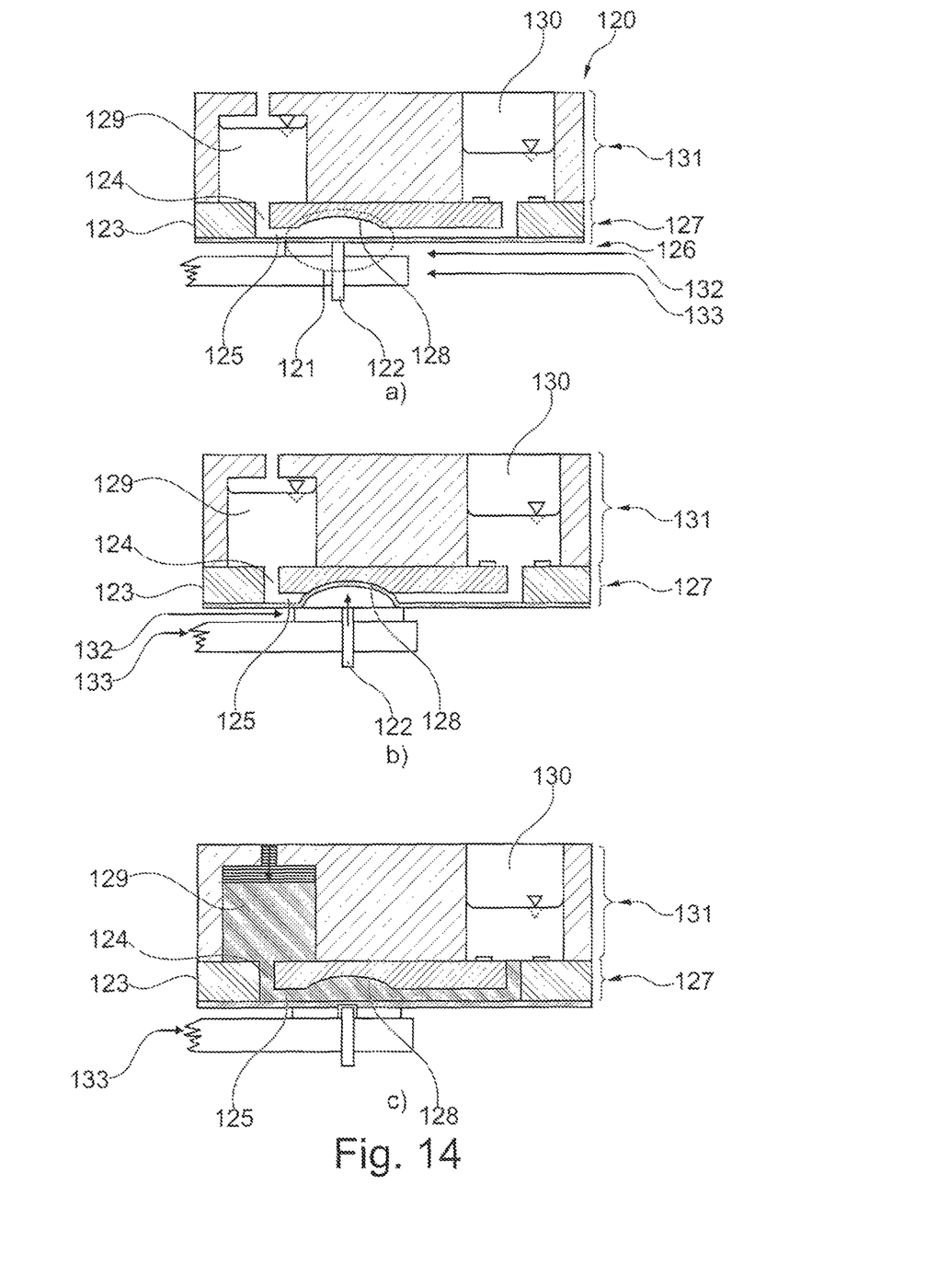

There are two types of dosing in this case: FIG. 14 shows an illustration of the pump sequence in the case of a preferably time-controlled pH regulation: a) initial pressure from above, opening of inlet, pump valve, b) opening of the outlet valve (over a certain time period=volume), c) closing all valves.

Figure 15:
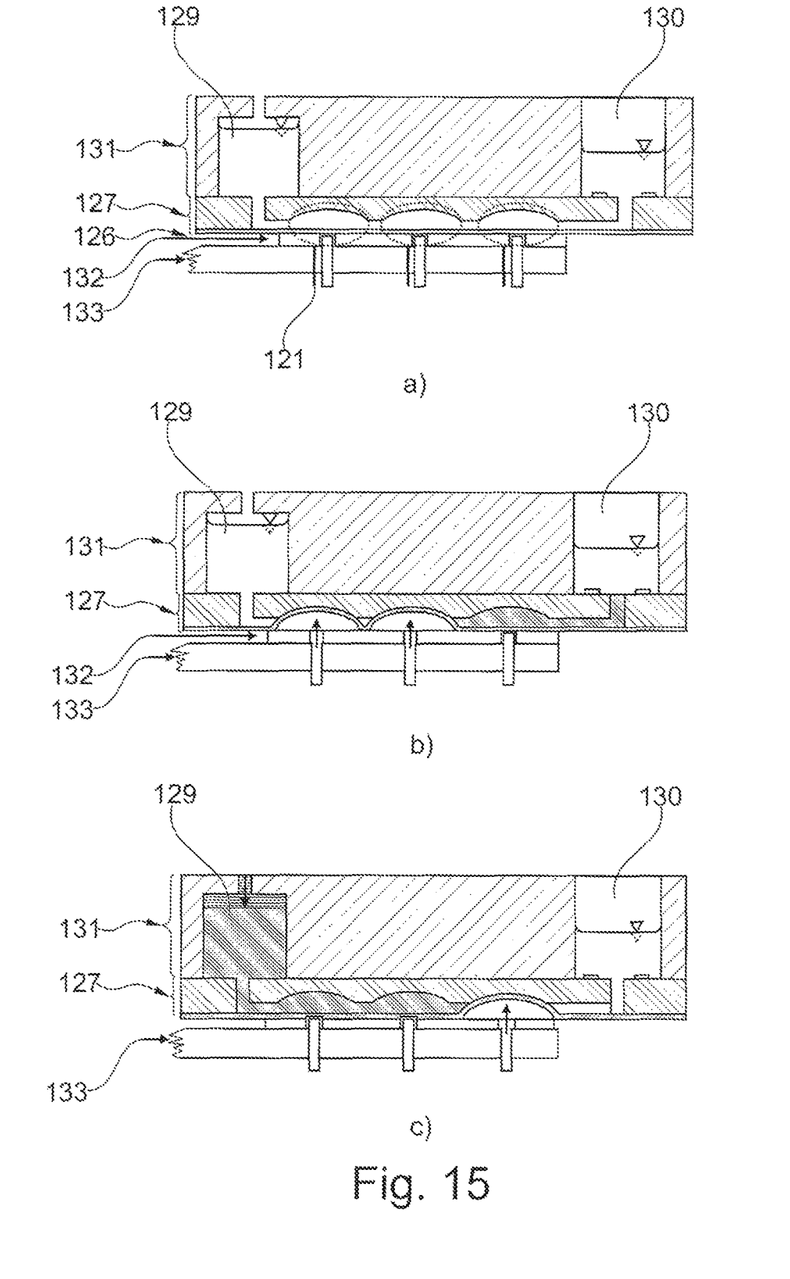

This pump sequence can be implemented with a plurality of valves, as shown in FIG. 15, or also in a simplified manner, only with one outlet valve, as shown in FIG. 14, then, the outlet valve is opened over a certain time period and thus a defined volume runs into the reaction chamber.

In the case of fed-batch in the pump sequence shown in FIG. 15, one differentiates the following steps: a) initial pressure from above, opening of inlet and pump valve, b) closing of inlet valve, c) opening of outlet valve and closing of pump valve (defined volume through pump hub, multiple runs of the pump sequence).

The invention claimed is:

1. A microreactor system comprising:
    (a) a reservoir;
    (b) a valve comprising:
        a base body having a top portion, a concave segment and an underside;
        an outlet extending through the top portion of the base body and in fluid communication with the reservoir;
        a membrane bearing against the underside of the base body;
        an annular elevation disposed concentrically around the outlet and protruding from the concave segment toward the membrane, wherein the annual elevation is arcuate in section;
        wherein the concave segment of the base body and the membrane define a hollow space in fluid communication with the outlet;
        an outlet channel disposed between the underside of the base body and the membrane;
        wherein the membrane is configured to bear against the annular elevation when under pneumatic or mechanical pressure, thereby sealing the valve; and
    (c) a reaction chamber in fluid communication with the outlet channel of the valve.

2. The microreactor system according to claim 1, wherein the concave segment of the base body comprises a depression constructed as a ball segment.

3. A fluid system comprising an array of microreactor systems according to claim 1, wherein the membrane is a single membrane which covers the underside of each base body of each valve of the array of microreactor systems.

4. The fluid system according to claim 3, further comprising a fluid system outlet arranged between an upper channel and a lower channel.

5. The fluid system according to claim 4, wherein the upper channel, the lower channel and the fluid system outlet are arranged in a microfluidically structured plate.

6. The fluid system according to claim 3, further comprising an actuator system comprising tappets or pneumatic lines acting on the membrane.

7. The fluid system according to claim 3, wherein the membrane is arranged between a microfluidic chip having a top and bottom edge and a tray.

8. The fluid system according to claim 6, wherein the actuator system is arranged on the membrane in a self-centering manner by aligning locking holes disposed in a microfluidic chip with corresponding pins disposed on a distributor strip.

9. The fluid system according to claim 6, wherein the actuator system comprises a pneumatic system acting on the membrane.

10. The fluid system according to claim 3, wherein each reservoir of the array of microreactor systems has a plurality of outlets.

11. The fluid system according to claim 3, further comprising sensors located in the reaction chambers, wherein the sensors measure parameters in the reaction chambers and output the parameters to an online system, in order to act on an actuator system.

12. The fluid system according to claim 3, further comprising an optical system.

13. The fluid system according to claim 3, further comprising a shaker for moving the reaction chambers.

14. The fluid system according to claim 3, wherein the plurality of outlets of the array of microreactor systems is arranged in such a manner that the plurality of outlets enable a pump function.

15. The fluid system according to claim 4, wherein a liquid flow is on a plane and the array of microreactor systems change the plane of the liquid flow.

16. The fluid system according to claim 7, wherein a plurality of valves of the array of microreactor systems are connected to one another.

17. The fluid system according to claim 3, wherein the system comprises optically transparent materials.

18. The fluid system according to claim 16, wherein the valves are arranged at the top edge of the microfluidic chip and allow optical access to the reaction chambers.

19. The fluid system according to claim 18, further comprising a lid, wherein the system is self-centered on a bearing surface via locking holes and pins and by clamping down on the lid with force action.

20. The fluid system according to claim 6, further comprising hydraulically actuated switches for controlling the valves.

21. The fluid system according to claim 6, further comprising mechanically or electromagnetically actuated switches for controlling the valves.

22. The fluid system according to claim 3, further comprising a clamping device configured to position and seal the system.

23. The fluid system according to claim 16, wherein the valves connect the reservoirs to the reaction chambers.

24. The fluid system according to claim 3, further comprising chemical or electrical sensors disposed in the reservoirs.

25. The fluid system according to claim 3, wherein the reservoirs are pressure loaded.

26. The fluid system according to claim 23, wherein a plurality of reservoirs open into the reaction chambers.

27. The fluid system according to claim 19, wherein the lid is gas-permeable and covers the reaction chambers.

28. The fluid system according to claim 19, further comprising a sterilization device for sterilizing the fluid system prior to use.

29. The fluid system according to claim 26, wherein the reaction chambers and/or reservoirs can be refilled.

30. The fluid system according to claim 18, further comprising a one-way valve feeding the reaction chambers.

31. The fluid system according to claim 16, wherein a valve of the array of microreactor systems is connected upstream of a multiplicity of further valves of the array of microreactor systems and is used for multiplexing.

32. The fluid system according to claim 6, wherein the actuator system is comprised as a connection strip comprising the tappets or pneumatic lines, and the fluid system further comprises a microtiter plate and a tensioning device.

33. The fluid system according to claim 32, further comprising a gas supply system attached to the reaction chambers by at least one gas supply channel leading to at least one outlet hole in a lid.

34. The fluid system according to claim 7, wherein a multiplicity of chemical, biochemical or biological reactions are controlled in the reaction chambers.

35. A method comprising:
providing a fluid system comprising an array of microreactor systems according to claim 1;
introducing a controlled liquid and/or gas supply into the fluid system;
using the valves to convey the controlled liquid and/or gas through the fluid system; and
using the fluid system for opening and closing the valves between reaction chambers of the array of microreactor systems.

36. A method comprising:
providing a fluid system comprising an array of microreactor systems according to claim 1;
introducing a controlled liquid and/or gas supply in the fluid system;
using the valves to convey the controlled liquid and/or gas through the fluid system; and
using the fluid system for pumping fluid out of a reservoir and into a reaction chamber of the array of microreactor systems.

* * * * *